June 15, 1943.          S. E. SMITH ET AL          2,322,199
                      DIVIDER FOR MEAT BOILERS
                        Filed Oct. 9, 1941

Sayle Edgar Smith
and Charles L. Straeten
INVENTOR

ATTEST-                 BY              R. G. Story
                                         ATTORNEY Patented June 15, 1943

2,322,199

UNITED STATES PATENT OFFICE 2,322,199

DIVIDER FOR MEAT BOILERS

Sayle Edgar Smith, Elmhurst, Long Island, N. Y., and Charles L. Straeten, Chicago, Ill., assignors to Industrial Patents Corporation, Chicago, Ill., a corporation of Delaware Application October 9, 1941, Serial No. 414,364

3 Claims. (Cl. 53—22)

This invention relates to a partitioning means for a pen and more particularly to a removable and adjustable partition in a pan for treating and molding of meat products.

In the past, it has been the practice to provide a plurality of individual pans of different dimensions to accommodate the variously sized pieces of the meat to be subjected to the usual processing steps. The present invention has been made to obviate the necessity and inconvenience of keeping in stock such a variety of sizes and provides adjustable means cooperating with a pan of uniform size so that compartments of adjustable volume can be arranged for the different sizes of meats.

The herein disclosed pan and partition for holding the meat during treatment may also serve to mold the meat during treatment. The removable partition means thus cooperates with the pan, not only to make available a compartment of any desired size but also to complete the one end of the mold or form.

Figure 1:
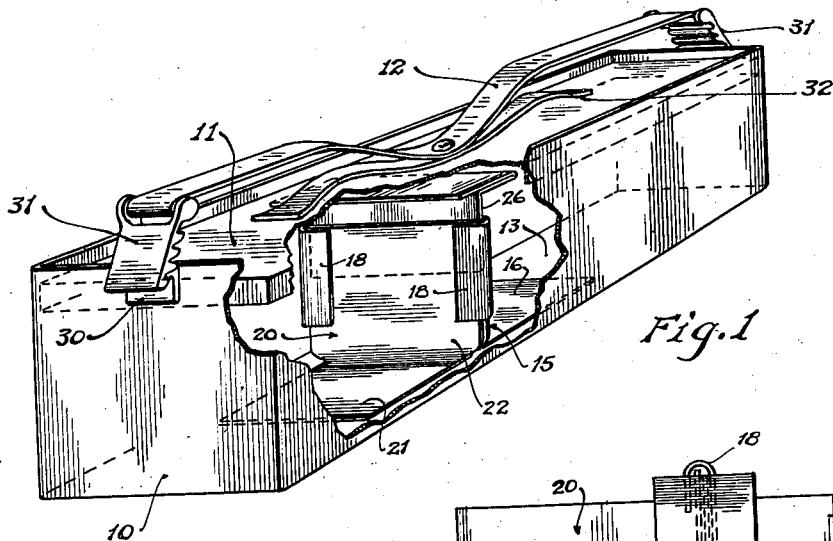
Fig. 1 is a perspective view partly broken away of the pan and cover with the removable partition means positioned therein.

As shown in Figure 1, which represents the preferred embodiment of this invention, the partition means is fitted into and is adapted to cooperate with the walls of a generally rectangular shaped pan 10 to divide the pan into a plurality of compartments. The pan has a substantially uniform transverse cross sectional configuration and may be provided with a cover 11 which fits telescopically within the side walls of the pan. The cover may be urged into engagement with the upper end of the partition means, as shown in Fig. 1, by any type of resilient means extending therein for engagement with the cover and a spring supporting means 12, for example, having a snap fit over the end walls of the pan, may be used.

Figure 2:
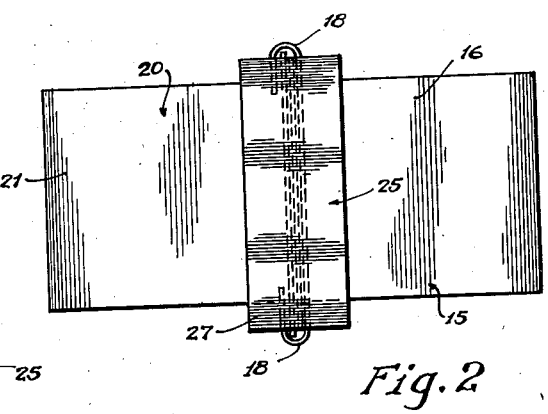
Fig. 2 is a plan view showing the parts forming the partition means interfitted together and in their assembled relation.
Figure 3:
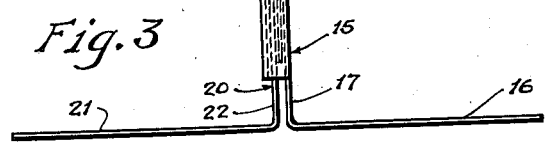
Fig. 3 is a side elevation of the partition means in assembled relation.
Figure 4:
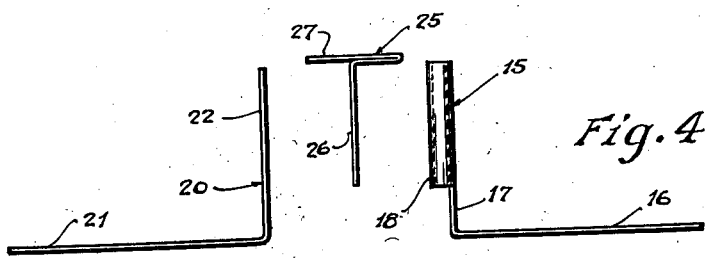
Fig. 4 is a side elevation showing the individual parts of the partition in their relative positions when assembled, but in spaced relation.

The partition within the pan and against which the cover engages is disposed substantially vertically with respect to the floor 13 of the pan and is typically shown as including the plurality of interfitted parts best shown in Figs. 2, 3, and 4. The parts, by reason of their construction, as will appear below, may be readily disassembled so that they can be cleaned and sterilized after use.

In the preferred construction, the generally L shaped part 15 has a horizontally extending vane 16 secured to the vertically extending wall 17 and the wall 17 has U shaped channel sections 18 formed integral therewith, to hold all of the elements in assembled relation.

A corresponding L shaped member 20 having a horizontal vane 21 and vertically extending wall 22 is adapted to be removably united with the part 15 by having the channel sections 18 telescopically arranged over the vertical wall 22 of the part 21. The channel sections 18 cooperating with wall 22 are designed to have sufficient clearance that the T shaped part 25 may be interfitted between the members 15 and 20.

The T shaped element has a vertical wall 26 integrally united to a horizontally extending cap-like element 27. The wall 26 may be inserted between vertical walls 17 and 22 and wall 26 is of such length that the T shaped element 25 may be adjusted to different heights vertically as shown in Fig. 3.

The outside dimensions of the wall 17 including the channel sections 18 are such that the assembled partition means may be inserted in the pan with its edges closely fitting the walls thereof to divide the pan into substantially two independent compartments. The fit is free enough that the partition may be easily slid longitudinally along the length of the pan and, with this construction, it is obvious that the partition may be adjusted to any position lengthwise in the pan to form compartments of any length to accommodate a piece of meat of any particular size.

When the cover 11 has been inserted in the pan, the spring supporting means 12 is applied. The pan has horizontally and outwardly extending lugs 30 fixedly secured thereon at each end, and spring supporting means 12 is provided with hinged catch members 31 at each end which cooperate with lugs 30. The catch members each have a plurality of notches for engaging the lugs so that the means 12 may be adjusted vertically. A spring 32 is fixed to means 12 and engages the cover 11 at spaced points to press it firmly downwardly. As shown, spring 32 has relatively widely spaced portions in contact with the cover, but it is contemplated that individual coil springs could be used, the coils being supported from means 12 at the desired spacing. The spring 32 engages the cover to urge it downwardly, as will appear more fully below, and member 12 may be adjusted vertically by reason of the notches in catch members 31 to provide the required tension.

In the use of this device the partition is inserted in the pan and adjusted to approximate position. The piece of meat is then inserted in the compartment and overlays either the horizontally extending vane 16 or 21 which rests immediately on floor 13. The assembled partition, if necessary, may again be adjusted longitudinally so that it will bear firmly against the piece of meat in the compartment. It will be noted that the meat bearing on the horizontally extending vane will cause the vertically extending wall to be maintained at substantially right angles with respect to the floor of the pan and the meat, while being treated, is molded into true rectangular form.

If, after the pan has been packed with one piece of meat, it is desired to fill the other compartment of the pan, a piece of meat may be selected which will just fill the remaining compartment, and after it is inserted therein to firmly bear against the walls and floor of the pan, including the other horizontally extending vane, the T shaped member 25 is fitted into position between the walls 22 and 17.

When either one or two pieces of meat are being treated and have been placed in the pan, the T element is fitted into position to complete the vertical wall at the partition means, and, in either case, the T member is adjusted vertically until the horizontal cap element 27 is substantially in the same plane as the upper surface of the meat in the pan. After the T member has been adjusted, the cover 11 of the pan is arranged over the meat and partition means as shown in Fig. 1. The spring supporting means 12 is then applied to the pan as shown in Fig. 1, and spring 32 bears against the cover on opposite sides of the partition member to press the cover firmly against the meat and upper end of the T member 27.

The pan packed as above described is ready to be inserted into the means for effecting the treatment or processing of the meat.

From the description given above and with the improvement here described, a pan of uniform size may be provided for the treatment of meat products, regardless of size. The partitioning means is adjustable longitudinally as explained so that a compartment of any desired volume may be provided and it is also possible that meats of two different sizes may be processed within the same pan.

The above described form of the invention is the preferred embodiment of this invention; however, many modifications of the invention defined in the following claims will occur to those skilled in the art.

We claim:

1. In combination a pan for receiving a material to be treated, said pan having a regular transverse cross-section and a removable partitioning means to divide the pan into compartments, said means including a plurality of interfitted parts, said parts forming a vertical wall, one of said parts having a horizontal vane that is engaged against the floor of the pan when a material is placed in said pan, said one part being also provided with a vertical wall, another of said parts having a vertical wall and a horizontally disposed cap member to engage the upper surface of the material in the pan, and means for slidably interfitting said vertical walls, said assembled parts being adapted to fit within said pan to form a vertical wall with respect to the floor thereof, a cover for the pan adapted to be disposed in substantial contact with said cap member, said partitioning means being adjustable longitudinally lengthwise of the pan and said other member being adjustable vertically with respect to said first named member whereby materials of non-uniform size may be individually placed in said pan whereupon said partitioning means and said cover may be closely fitted to the material to mold it while it is being processed and said material will be firmly engaged between said vane and said cap so that the partitioning means is stabilized in a vertical position with respect to the floor.

2. In combination a pan for receiving a material to be treated, said pan having a regular transverse cross-section and a removable partitioning means to divide the pan into compartments, said means including a plurality of interfitted parts, said parts forming a vertical wall, one of said parts having a horizontal vane that is engaged against the floor of the pan when a material is placed in said pan, said one part being also provided with a vertical wall, another of said parts having a horizontal vane that is engaged against the floor of the pan when a material is placed in said pan and a vertical wall, still another of said parts having a vertical wall and a horizontally disposed cap member to engage the upper surface of the material in the pan, and means for slidably interfitting all of said vertical walls, said assembled parts being adapted to fit within said pan to form a vertical wall with respect to the floor thereof, a cover for the pan adapted to be disposed in substantial contact with said cap member, said partitioning means being adjustable longitudinally lengthwise of the pan and said third named member being adjustable vertically with respect to said first two named members whereby materials of non-uniform size may be individually placed in said pan whereupon said partitioning means and said cover may be closely fitted to the material to mold it while it is being processed and said material will be firmly engaged between at least one of said vanes and said cap so that the partitioning means is stabilized in a vertical position with respect to the floor.

3. In combination a pan having a regular transverse cross-section and a removable partitioning means to divide the pan into compartments, said means including a plurality of interfitted parts, said parts forming a vertical wall, one of said parts having a horizontal vane, said one part being also provided with a vertical wall having channel sections disposed along each vertical edge thereof with the open sides of the channel section facing each other, another of said parts having a horizontal vane and a vertical wall for slidably interfitting in said facing channel means, still another of said parts having a vertical wall to slidably fit between the vertical walls of each of said first two named parts, and said last named part having a horizontally disposed cap member, said assembled parts being adapted to fit within said pan to form a vertical wall with respect to the floor thereof, a cover for the pan adapted to be disposed in substantial contact with said cap member, said partitioning means being adjustable longitudinally lengthwise of the pan and said third named member being adjustable vertically between said first two named members whereby materials of non-uniform size may be individually placed in said pan whereupon said partitioning means and said cover may be closely fitted to the material to mold it while it is being processed.

SAYLE EDGAR SMITH.
CHARLES L. STRAETEN.